United States Patent Office 3,375,873
Patented Apr. 2, 1968

3,375,873
CEMENT COMPOSITION FOR HIGH
TEMPERATURE WELLS
Farris Mitchell, Dallas, Tex., assignor to Mobil Oil
Corporation, a corporation of New York
No Drawing. Filed Nov. 16, 1964, Ser. No. 411,602
9 Claims. (Cl. 166—31)

ABSTRACT OF THE DISCLOSURE

This specification discloses a cement composition, a cement slurry containing the cement composition, and a method of cementing a well employing the cement composition. The cement composition comprises portland cement containing ferrochrome lignosulfonate. The ferrochrome lignosulfonate enables the cement slurry to be pumped at temperatures in excess of 250° F. and even up as high as 325° F. without premature setting. The ferrochrome lignosulfonate also provides fluid loss control without destroying the ability of the cement slurry to set at lower temperatures and have adequate compressive strength.

---

This invention relates to cements and relates more particularly to cements for use in wells which are at high temperatures.

Frequently, in the drilling and treatment of wells extending from the surface of the earth to a subterranean formation, it is necessary or desirable to employ a cement composition. For example, in the drilling of a well for the recovery of oil or gas from a subterranean formation, the casing is secured in place in the well by cementing. In this cementing operation, a cement slurry is pumped downwardly from the surface of the earth through tubing to the bottom of the well and thence upwardly between the casing and the walls of the well. After the cement slurry has been pumped between the casing and the walls of the well, a pumping is discontinued and the cement is permitted to set in place. Further, for example, in the drilling of such wells, porous formations are often encountered from which an undesired fluid, such as water, flows into the well or into which the drilling fluid used in the drilling of the well is lost. The method of correcting for such conditions encountered during the drilling operation is to seal the porous formation with cement. In these, and other cementing operations in a well, an aqueous slurry of portland cement is commonly used.

In cementing operations in deep wells, the hydrostatic pressure of a long column of cement slurry can result in forcing water from the slurry and into permeable formations. This loss of water is commonly referred to as fluid loss. It can result in premature loss of pumpability and in premature setting of the cement of an undesirable location in the well.

In cementing operations in wells at high temperatures, difficulties are also encountered with premature setting of the cement. At temperatures in excess of about 200° F., for example, 250° F., portland cement sets rapidly and setting can occur before the cement slurry can be pumped into place in the well. With greater depths, greater times are required to pump the cement slurry from the surface of the earth to the desired location in the well. These greater times are required not only because of the greater distance of travel but also because of the generally decreased diameter of the tubing and, where the casing is being cemented, the generally decreased annular clearance between the casing and the walls of the well.

Several additives have been suggested to control the fluid loss from the cement slurry and prevent premature setting of the cement. These additives suffer from one or more disadvantages. Most of the suggested additives thin out and lose their ability to control loss of fluid from the cement slurry before a temperature of 250° F. is reached. Some of the additives thin out and lose their efficacy in retarding the set of and in retaining pumpability of the slurry at such high temperatures. While some of the additives retain a modicum of efficacy at the high temperatures, they retard the setting time of the cement slurry so severely that it will not set in shallower formations after having been circulated through the hot, deeper formations. This necessitates what is commonly termed stage cementing. In stage cementing, the deeper portions of the casing are cemented into the wellbore where the cement will set. The shallower portions of the casing are then cemented in place using a different composition of cement. Stage cementing is a expensive procedure and desirably is avoided.

It is an object of this invention to provide a cement composition for use in cementing operations in high temperature wells.

It is another object of this invention to provide a cement slurry which will set adjacent both deep and shallow formations in cementing casing in a well penetrating therethrough.

It is a particular object of this invention to provide a method of cementing high temperature wells which avoids the necessity for stage cementing.

It is a particular object of this invention to provide a cement slurry which has a controlled loss of water in deep wells and which remains pumpable at temperatures in excess of 250° F., and yet which sets within a reasonable time at temperatures lower than 180° F.

It is also an object of this invention to provide a method of pumping cement slurry into a deep well having a range of temperatures, some in excess of 250° F., and setting the cement slurry within reasonable time at the desired depths in the well.

Further objects of the invention will become apparent from the following description.

In accordance with the invention, there is provided: (1) a cement composition containing portland cement and, as the essential active ingredient with respect to providing satisfactory properties both at elevated and lower temperatures, ferrochrome lignosulfonate; (2) a cement slurry containing the cement composition: and (3) a method of cementing a well employing the cement composition.

The ferrochrome lignosulfonate in the cement composition enables the cement slurry made therefrom to be pumped at temperatures in excess of 250° F. and even up as high as 325° F. without premature setting. Further, enough ferrochrome lignosulfonate can be employed to provide fluid-loss control even at such high temperatures without destroying the ability of the cement slurry to set in the formations having lower temperatures, e.g., less than 180° F. Moreover, the set cement has adequate compressive strength when ferrochrome lignosulfonate is used in the cement slurry.

Ferrochrome lignosulfonate is essentially the ferric salt of a sulfonated lignin, which salt has been oxidized with a sodium dichromate solution. An example of a sulfonated lignin is paper pulp which has been sulfonated, for example, with chlorosulfonic acid. A ferrochrome lignosulfonate employed in the invention may be prepared as described in U.S. Patent No. 2,935,473 to Ellis Gray King et al., issued May 3, 1960. This material is commercially available under the trade name "Q-Broxin."

The ferrochrome lignosulfonate is employed in the cement composition in amount sufficient to prevent loss of pumpability and premature setting of a cement slurry made from the cement composition under the highest temperatures to which the slurry is subjected. The ferrochrome lignosulfonate is employed in an amount of at least 0.5 percent by weight of the dry portland cement employed. Yet, the amount of ferrochrome lignosulfonate employed must be below an amount which excessively retards the setting time of the cement in the lowest temperatures in which it must set. The maximum amount of ferrochrome lignosulfonate which is employed is about 15 percent by weight of the dry portland cement. Ordinarily, an amount of from 2.5 to 10 percent by weight of ferrochrome lignosulfonate is employed. In forming a cement slurry for cementing operations at relatively great depths and at relatively high temperatures, e.g., 8,000 to 20,000 feet and about 200° to 325° F., respectively, a cement composition comprising portland cement and ferrochrome lignosulfonate in an amount of from 3 to 15 percent by weight of the portland cement is employed. In forming a cement slurry for cementing operations in depths of less than 10,000 feet, a cement composition comprising portland cement and ferrochrome lignosulfonate in an amount of from 2.5 to 5 percent by weight of the portland cement is employed. The remainder of the weight of the cement slurry may consist essentially of water.

The amount of water employed in the cement slurry is that amount conventionally employed in the cement slurries used in cementing operations in wells penetrating subterranean formations. For example, the water may comprise from 23 to 40 percent of the total weight of the slurry.

A cement slurry containing ferrochrome lignosulfonate, portland cement, and water may also contain other materials commonly employed in cement slurries for use in wells. For example, the cement slurry may contain various additives for preventing strength retrogression at high temperatures. Thus, the cement slurry may contain silicic acid or silica flour. Additionally, the cement may contain calcium chloride or sodium chloride. In this connection, the water employed for preparing the cement slurry may be sea water; and in this way, the slurry will contain sodium chloride.

The cement slurries containing ferrochrome lignosulfonate have particular application in deep wells in which it is necessary to circulate a cement to the bottom of the well where it encounters high temperatures and to return it to the shallower formations where it encounters lower temperatures. The ferrochrome lignosulfonates are thermally stable and are more resistant to high temperature degradation than are the other lignosulfonate additives. Hence, they retain fluid-loss control capability, cause the cement slurry to remain pumpable for longer periods of time, and, yet, result in a relatively impermeable cement which sets well in the shallower formations.

The following examples will be illustrative of the invention. The portland cement employed therein was an API Class A cement. The ferrochrome lignosulfonate employed was Q-Broxin. It is sometimes abbreviated as FCL. Pumping time, compressive strength, and filter loss of the cement slurries were measured. These measurements were carried out according to standardized procedures of the American Petroleum Institute (API) and described in API RP 10B, "API Recommended Practice for Testing Oil-Well Cements and Cement Additives," 8th edition, January 1959.

Example I

Cement slurry No. 1 was prepared by admixing water and portland cement in a proportion of 46 parts by weight of water and 100 parts by weight of cement. Cement slurry No. 2 was prepared by admixing water and a cement composition in a proportion of 46 parts by weight of water to 100 parts by weight of cement composition. The cement composition consisted of 100 parts by weight of portland cement and 3 parts by weight of ferrochrome lignosulfonate, i.e., the ferrochrome lignosulfonate (FCL) was present in an amount of 3 weight percent of dry cement.

The pumping time on samples of slurry No. 1 and slurry No. 2 was determined by the pressure-temperature thickening time test method, following the API 12,000-foot Casing-Cementing Well-Simulation Test, Schedule 7, in which the cement slurry was subjected to increasing temperature and pressure for a period of 74 minutes. At the end of this time, the cement slurries were at a temperature of 172° F. and a pressure of 10,230 pounds per square inch (p.s.i.). The slurries were maintained at this temperature and pressure until the slurries reached a consistency of 100 poises or the test was terminated. The data for pumping time are set forth in Table I.

TABLE I.—PUMPING TIME DATA FOR AN API 12,000-FOOT CASING-CEMENTING WELL-SIMULATION TEST, SCHEDULE 7

| Slurry No. | FCL (wt. percent of cement) | Pumping Time to 100-poise Slurry Consistency, minutes |
|---|---|---|
| 1 | 0 | 77 |
| 2 | 3 | (¹) |

¹ Test terminated after 420 minutes with the slurry still extremely fluid and with a consistency of 18 poises.

The ferrochrome lignosulfonate provides good retardation and gives a large increase in pumping time under high temperature and high pressure conditions.

Data on the relative compressive strengths of two cement samples resulting from the slurries prepared above are tabulated in Table II.

TABLE II.—COMPRESSIVE STRENGTH DATA

| Slurry No. | FCL (wt. percent of cement) | 24-hour Compressive Strength at 180° F. Curing Temperature, p.s.i. |
|---|---|---|
| 1 | 0 | 5,900 |
| 2 | 3 | 4,360 |

The data in Table II show the ferrochrome lignosulfonate caused only a slight reduction in compressive strength, which remained well above the compressive strength necessary for cementing operations in a well in a subterranean formation.

Example II

Cement slurry No. 3 was prepared by admixing water and a second cement composition in a proportion of 46 parts by weight of water per 100 parts of second cement composition. The second cement composition consisted of 100 parts by weight of portland cement and 6 parts by weight of ferrochrome lignosulfonate. Samples of cement slurries Nos. 1, 2, and 3 were compared to demonstrate that fluid-loss control, as measured by the API Filter Loss Test, is provided by incorporating the ferrochrome lignosulfonate into the cement composition. Comparative data on these three cement slurries are presented in Table III.

TABLE III.—API FILTER LOSS TEST DATA

| Slurry No. | FCL (wt. percent of cement) | API Filter Loss for 30-Minute Test Period, cc. |
|---|---|---|
| 1 | 0 | 437 (hypothetical fluid-loss value since sample dehydrated before end of test period). |
| 2 | 3 | 78.5 (hypothetical fluid-loss value since sample dehydrated before end of test period). |
| 3 | 6 | 21. |

The data indicate that a greater amount of ferrochrome lignosulfonate lowers the fluid loss of a cement slurry.

While the invention has been described particularly in connection with cementing operations in a well, it will be understood that it may be employed in any circumstance where a portland cement slurry must be pumped for a prolonged period of time at elevated temperatures. It is particularly applicable where it must be pumped through a region of high temperature into a region of lower temperature and set in the region of lower temperature.

Having thus described my invention, it will be understood that such description has been given by way of illustration and example and not by way of limitation,

What is claimed is:

1. A cement composition particularly useful upon admixture with water for pumping through a region of temperature in excess of 250° F. and settable in temperatures below 180° F. comprising portland cement in admixture with at least 2.5 percent by weight of ferrochrome lignosulfonate based on the amount of portland cement present.

2. The composition of claim 1 wherein said ferrochrome lignosulfonate is in an amount of from 2.5 to 10 percent by weight.

3. The composition of claim 1, wherein said ferrochrome lignosulfonate in an amount of from 2.5 to 5 percent by weight.

4. The composition of claim 1, wherein said ferrochrome lignosulfonate is present in an amount of from 3 to 15 percent by weight.

5. A cement slurry particularly useful for pumping through a region of temperature in excess of 250° F. and settable in temperatures below 180° F. comprising water, portland cement, and ferrochrome lignosulfonate in an amount of from 2.5 to 10 percent by weight of said portland cement present.

6. In the process for the treatment of a well in the earth wherein a cement slurry is pumped into said well and permitted to set therein, said well penetrating subterranean formations having a temperature in excess of about 250° F., the steps which include:

(a) forming a cement slurry comprising water, portland cement, and ferrochrome lignosulfonate, the ferrochrome lignosulfonate being in an amount of at least 2.5 percent by weight based on the amount of said portland cement present, (b) pumping said slurry into said well, and (c) holding said slurry in said well until said cement slurry has set.

7. The process of claim 6, wherein said ferrochrome lignosulfonate is present in an amount of from 2.5 to 10 percent by weight.

8. The process of claim 6, wherein said ferrochrome lignosulfonate is present in an amount of from 2.5 to 5 percent by weight.

9. The process of claim 6, wherein said ferrochrome lignosulfonate is present in an amount of from 3 to 15 percent by weight.

References Cited

UNITED STATES PATENTS

| | | | |
|---|---|---|---|
| 2,646,360 | 7/1953 | Lea | 106—90 |
| 2,690,975 | 10/1954 | Scripture | 106—90 |
| 3,022,824 | 2/1962 | Binklel et al. | 106—90 |
| 3,126,291 | 3/1964 | King et al. | 106—90 |
| 3,190,356 | 6/1965 | Beach | 106—90 |
| 3,197,316 | 7/1965 | Beach | 106—90 |

TOBIAS E. LEVOW, *Primary Examiner.*

S. E. MOTT, *Assistant Examiner.*